United States Patent Office 3,413,925
Patented Dec. 3, 1968

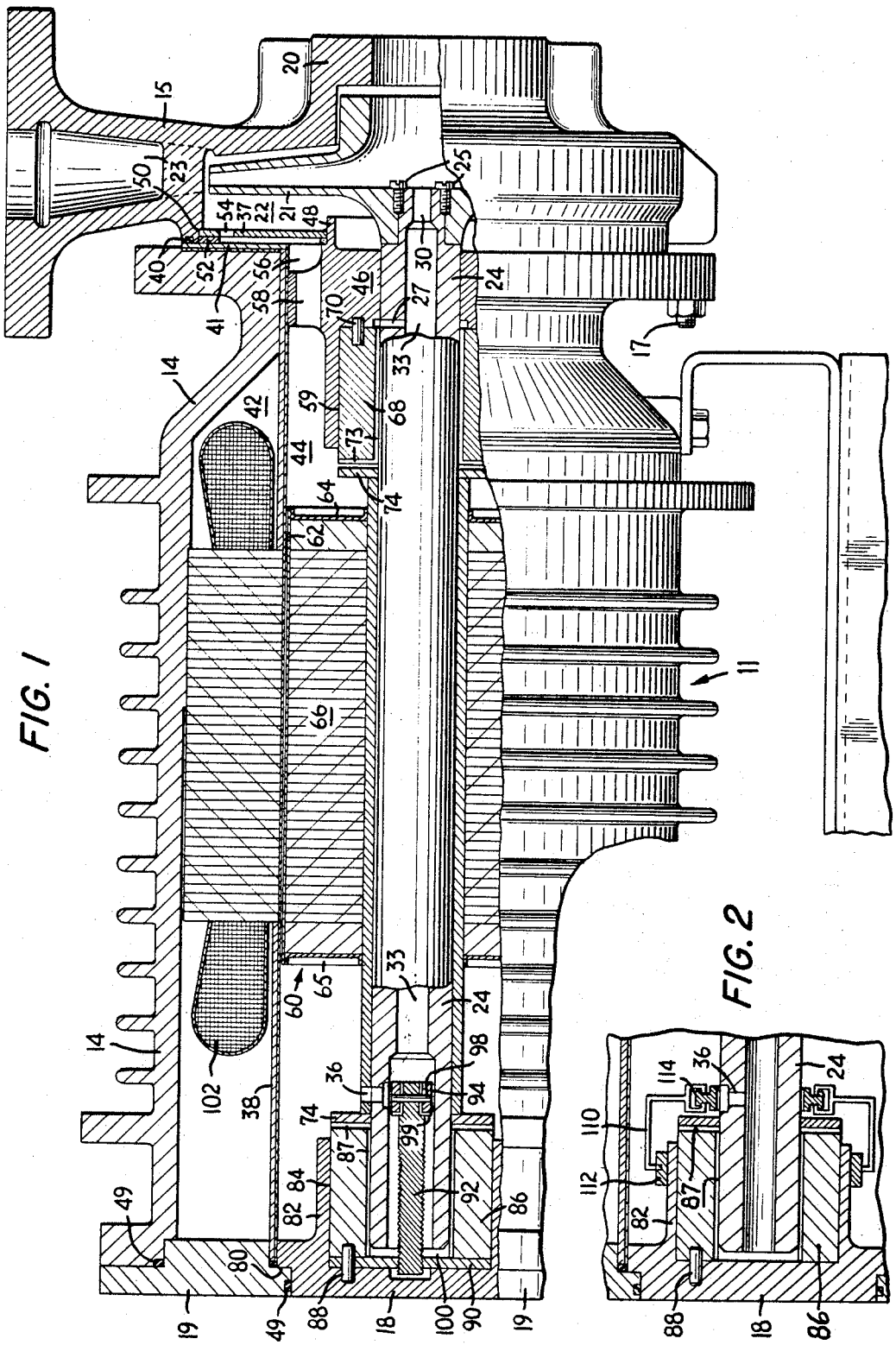

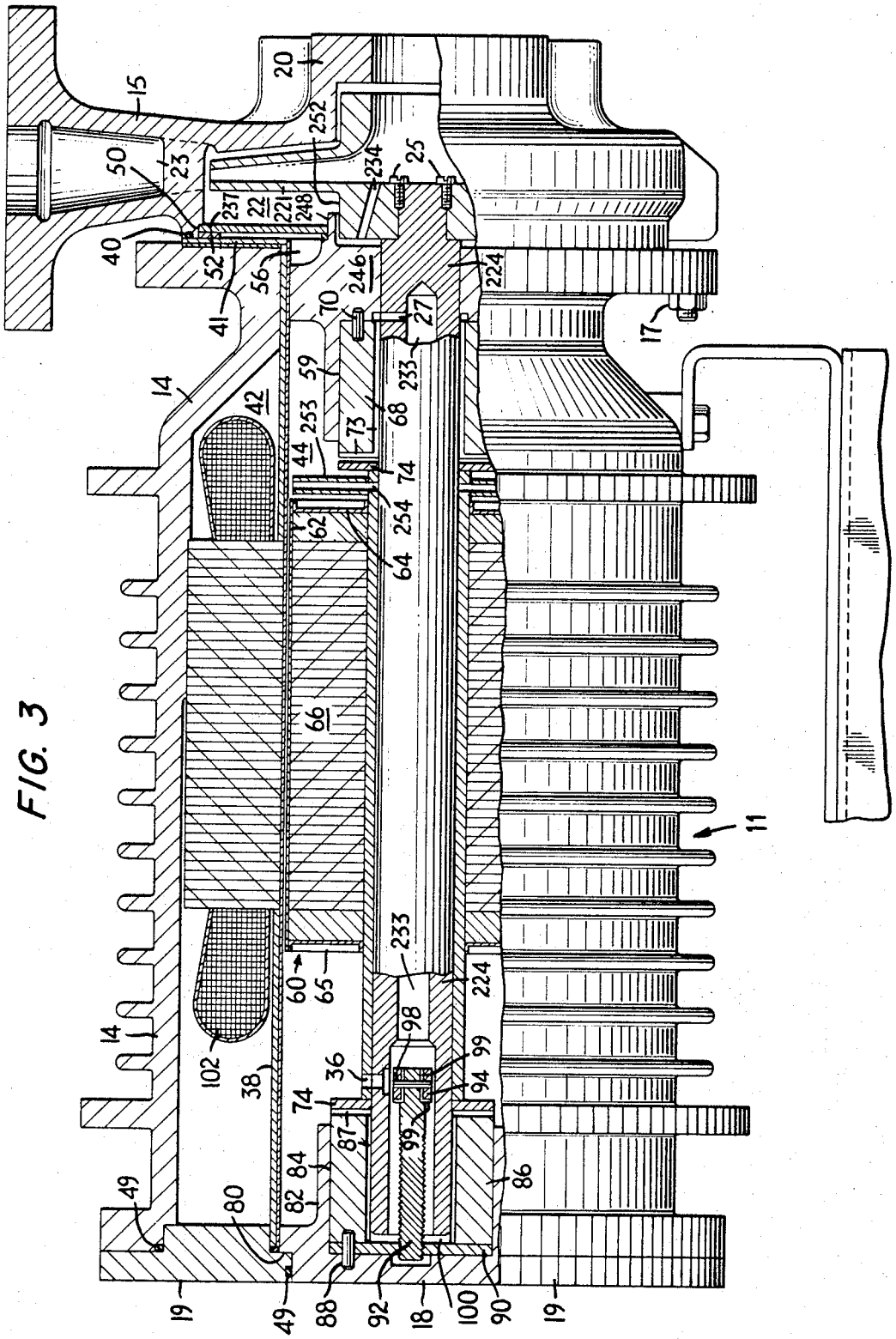

3,413,925
CENTRIFUGAL PUMP HAVING THRUST BALANCING MEANS
Joseph F. Campolong, Danielson, Conn., assignor, by mesne assignments, to Laboratory for Electronics, Inc., Waltham, Mass., a corporation of Delaware
Filed Mar. 30, 1966, Ser. No. 538,647
16 Claims. (Cl. 103—87)

ABSTRACT OF THE DISCLOSURE

A cenrifugal pump is provided having means for balancing the forward hydraulic thrust on the impeller shaft which comprises a slide valve at the rear of a hollow channel through the impeller shaft which regulates the flow of fluid from the rear of the rotor chamber through the pump shaft to the inlet to the centrifugal pump thereby regulating the amount or reverse thrust applied to the shaft. The valve is placed so as not to affect the flow of fluid through the rear bearing supporting the shaft.

---

This invention relates to a centrifugal pump having means for balancing the forward hydraulic thrust on the impeller shaft resulting from an imbalance in the forces against the interior wall and rear outer wall of the impeller. More particularly, it relates to a centrifugal pump wherein the forward thrust on the impeller is opposed by a rearward thrust on the shaft resulting from and proportional to the difference between pump outlet pressure and pump inlet pressure.

This invention is especially useful in a canned centrifugal motor pump. The canned, or close-coupled, pump is characterized by having the motor housing and the pump housing combined within a single enclosure. This type of pump is especially useful when it is undesirable to have any leakage, such as when pumping extremely corrosive or noxious fluids, or to prevent the leakage of air into the system which might lower the vacuum level or overpower the vacuum producing system in a distillation system.

Minimizing forward hydraulic thrust of the impeller shaft in a centrifugal pump of the canned motor type has long been a problem. One means for containing such thrust is the thrust bearing, which comprises (1) a thrust washer, attached to the impeller shaft, and (2) in rotating contact with the thrust washer, the rear bearing face of the front bearing supporting the impeller drive shaft. These parts are prone to wear out, due to the constant rubbing of the washer face against the bearing material under the relatively large thrust force. The thrust washer and bearing face must be prefectly flat and perpendicular to the longitudinal axis of rotation of the shaft, since even the slightest angle from the perpendicular will result in a moment on the shaft perpendicular to the longitudinal axis, and an uneven wear on the shaft bearing and misalignment of the rotor and impeller.

Frequently, to reduce or balance forward thrust, a circular flange is provided extending rearwardly from the back of the impeller, with a concentric circular portion extending forwardly from the pump housing and forming a close fit with the first flange. These are called balance rings. A passage is provided through the back wall of the impeller, connecting the input end of the impeller with the chamber defined by the balance rings. The chamber defined by the balance rings is accordingly at approximately inlet pressure if the balance rings are fitted closely enough to form a moving seal when the impeller spins. By suitable adjustment of the diameters of, and the clearance between, the flanges, the total forward thrust against the rear outer face of the impeller can be decreased to balance the rearward thrust against the inner rear face of the impeller. To provide suitable balancing, however, the flanges must be dimensioned and machined very carefully, and even then only an approximate balancing is obtained, over a narrow range of operating conditions.

Although the balance rings form a moving seal, there is still some leakage of high pressure fluid from the exhaust end of the impeller to the chamber in the rear of the impeller which is substantially at or near inlet pressure. The power loss caused by this leakage can be very substantial, usually a minimum of between 5% and 10% for medium to large pumps. For smaller pumps, the loss is proportionally even higher and becomes so great as to prohibit using this method of thrust balancing for smaller pumps.

An additional problem arising with thrust balancing is that when the bearings begin to wear, the balance rings become eccentric to each other and they begin to rub; the accuracy of the balancing effect is lost. Even a small change in the concentricity of the balance rings tends to vary the balancing effect significantly. When the balance rings wear, the seal formed between the flange and the concentric portion is broken and fluid leaks into the chamber defined by the balance rings, increasing the power loss discussed above and decreasing the balance effect of the balance rings.

Other means have been provided, such as the so-called "floating" impeller shaft, wherein the shaft has a certain amount of free end-play along its longitudinal axis and is allowed to shift back and forth as the net thrust and counterthrust varies. This type of device depends upon a balancing of the forward thrust forces inherent in the operation of the impeller, with the force applied in an opposite direction resulting from the pressure drop across the rotor. One embodiment of such a device is disclosed in U.S. Patent No. 3,031,973 to Kramer. In this device, Kramer employs a motor compartment divided into two sections by the rotor. The rotor is so designed that fluid flow between the two sections can only be through the narrow annular gap separating the rotor and stator.

These two sections are in fluid flow connection with the low pressure sides of the impeller. The first or forward section of the compartment is also in connection with the high pressure side of the impeller. The low pressure connections are made through variable channels formed between a pair of flanges in each section, one flange in each pair being attached to the shaft, and the other to the bearing. These flanges act as thrust bearings and serve to limit the end-play. The channels between the flanges connect to the bearings, and then to the low pressure side of the impeller. This also allows the fluid to lubricate and cool the bearings.

The high pressure from the outlet side of the impeller acts against the front end of the rotor to force the shaft backward until the flange strikes against the rear bearing. This closes the rear bearing, preventing any additional fluid from passing out from the rear compartment, while the open front compartment channel decreases the pressure in the front compartment. The forward thrust thus developed then forces the shaft forward until the flange strikes the front bearing, the rear channel is opened, the front channel is closed, and the backward thrust resulting from the pressure drop across the rotor builds up again until it exceeds the forward thrust, and again forces the shaft backwards until the flange strikes against the rear bearing, repeating the process.

If some change in operation forces the pump to operate in a position where one of the pairs of flanges is in continuous contact, the bearing will not be properly lubricated, as the flow of lubricant will be cut off when the channels are closed, and the bearing will eventually run dry and bind. Fluid can flow between the bearing surfaces from the rotor compartment only when the flanges are separated; when they are touching, this flow is impossible. Similarly, when the plates are separated, this flow is limited by the size of the bearings.

Other centrifugal devices utilizing the pressure from the impeller to act against the forward thrust are described in U.S. Patents Nos. 2,809,590, 2,715,367 and 1,146,079.

Another type of device is that shown in U.S. Patent No. 3,053,189 to White. White attempts to provide a balanced impeller, i.e. where the resultant force exerted by the impeller on the shaft is zero. White provides means for applying a lower pressure to at least a portion of the rearwardly facing surface of the impeller to decrease the forward forces being exerted on the impeller until they are ideally equal to the rearward forces being exerted on the impeller. This system similar to the balance rings described earlier, with added means for varying the pressure behind the impeller. Accordingly, it suffers from the same problems described earlier for balance rings.

In accordance with the invention, a pump having a "floating" impeller shaft is provided in which the forward thrust exerted by the impeller is offset by a rearward thrust exerted by a thrust member attached to the impeller shaft and having front and rear transverse pressure faces. The rearward thrust exerted by the thrust member is proportional to the pressure drop between the front and rear transverse faces of the thust member, which is determined by the position of the shaft relative to a valve member at the rear end of the shaft in telescoping relationship to the shaft.

The pump of the invention comprises, in combination, a housing having an impeller shaft chamber, and a pumping chamber having fluid inlet and outlet passages; an impeller rotatably disposed across the line of fluid flow therebetween; an impeller shaft in the impeller shaft chamber extending into the pump chamber and supporting the impeller; bearing means in the housing rotatably supporting the shaft and allowing axial movement of the shaft; a divider attached to the shaft, having a front pressure surface and a rear pressure surface and dividing the impeller shaft chamber into a rear fluid section and a front fluid section, the rear pressure surface under fluid pressure in the rear fluid section tending to urge the shaft forwardly, and the front pressure surface under the pressure of the outlet side of the impeller tending to urge the shaft rearwardly; a restricted fluid passage connecting the front and rear fluid sections; an axial passage in the shaft having a front opening connecting the axial passage to the inlet side of the impeller and a rear opening connecting the axial passage to the rear fluid section; and a slide valve in telescoping relationship to the shaft in close proximity to the rear opening, and in one position of the shaft substantially closing off the rear opening to fluid flow, and in a second position of the shaft permitting fluid flow via the rear opening between the rear fluid section and the axial passage. The pressure surfaces are dimensioned to produce a net rearward thrust against the shaft when there is flow through the rear opening, to overcome the forward thrust produced by the impeller.

Preferably, the pump of the invention is a canned motor pump enclosed in a housing including a rotor chamber, a stator chamber, and the pumping chamber, with the impeller shaft and a motor rotor in the rotor chamber, and a stator in the stator chamber. In a preferred embodiment of a canned pump, the stator and rotor are concentric, and are separated by a narrow gap which constitutes the restricted fluid passage between the front and the rear fluid sections of the rotor chamber. In this preferred embodiment, the rotor is usually fully enclosed in a can, the end covers of which form the front and rear pressure surfaces.

In an axial type of motor, the rotor and the stator will be disposed in an axial relationship, but are also separated by a narrow gap. In this situation, the rotor can also be enclosed in a can, which can serve to separate the front and rear pressure surfaces, as in the concentric type discussed above.

Generally, the front and rear pressure surfaces will have the same surface area exposed to fluid pressure. However, the surfaces can be adjusted in relative area to meet any inlet and outlet pressure difference requirements, and to obtain a net rearward or net forward thrust of the impeller shaft, as may be desired. For example, to increase the net rearward thrust, the surface area of the front face will be made greater than that of the rear face.

In the preferred embodiment of a canned pump where the rotor chamber and stator chamber are concentric, they can be separated by an inner shell. In many circumstances the shell forms a fluid tight seal between the chambers. The rotor is mounted on the shaft with the narrow gap being formed between the rotor and the shell surrounding the rotor chamber. The rotor should be enclosed in a can, the ends of which serve as the pressure surfaces acting on the shaft.

Preferably, the slide valve is held on a slide valve support rigidly attached to the rear of the housing and extending into the axial passage. The slide valve preferably is attached to the valve member so that it has free play radially, allowing it to be suspended in the axial passage and carried by the fluid in the passage. This is especially useful if the valve is dimensioned to be able to slide freely within, but also to form a close fit with the axial passage, to adjust to any eccentric positioning of the shaft with respect to the valve support and to compensate for radial bearing wear during operation.

The valve can also be formed as a ring or sleeve encircling the shaft where the rear opening is located. This sleeve valve can also be constructed so as to have free play radially around the shaft. In addition, the inner dimensions of the ring are preferably such as to form a close but slidable fit around the shaft.

The shaft is so journaled within the bearings that there is a small amount of axial movement or end-play allowed. The end-play is generally limited by stop rings rigidly attached to the shaft and having transverse faces in alignment with similar transverse faces on the ends of the bearings.

The general principles of operation are as follows, with respect to a preferred embodiment of a canned pump. As the pump operates, the normal fluid flow is from the pump inlet to the pump outlet, from which a portion flows to the front section of the rotor chamber, through the restricted fluid passage to the rear fluid section, through the rear opening to the axial channel and then to the inlet side of the impeller. The flow through the impeller produces a net forward force which is transmitted to the shaft as the forward thrust. The difference in pressure between the front section of the rotor chamber and the rear fluid section, caused by the pressure drop through the restricted passage and exerted on the front and rear pressure surfaces, respectively, produces a rearward thrust on the shaft. If the rearward thrust is less than the forward thrust, the shaft will be shifted forward. This will change the relative positions of the slide valve and the rear opening, so as to increase the extent of the rear opening and thus the amount of fluid which can flow through the opening. This in turn will increase the flow through the gap and thereby the pressure drop between the front portion of the rotor chamber and the rear fluid section; this will proportionately increase the rearward thrust on the shaft.

The shaft will continue to shift until an equilibrium point is reached where the forward thrust is approximately, or, ideally, exactly, balanced out by the rearward thrust. The shaft at this point will be located at a position somewhere between the limits of its free play.

In systems where the pumped fluid in its pumped condition cannot be used to cool and lubricate the motor and bearings, as when slurries, corrosive liquids, or high temperature fluids are pumped, the motor compartment will be sealed off from the pump chamber. In this case, the motor fluid can be the same or different from the pumped fluid. In such circumstances, an auxiliary impeller can be provided in the front section of the rotor chamber, to provide the pressure needed for thrust balancing. The auxiliary impeller is best attached to the shaft, and arranged to draw fluid from the central shaft channel and exhaust fluid to the front section, in which case the front section of the rotor chamber will be at the exhaust pressure from the auxiliary impeller, and the rear section will be at a lower pressure.

Balancing rings similar to those described earlier can be used in combination with the slide valve and auxiliary impeller system described above. The balance rings provide a rough balancing, with the final trimming, or fine balancing, being done by the slide valve and auxiliary impeller in the rotor chamber. This combination avoids the usual problems of careful machining and calibrating of the balancing rings. The problems arising from wear of the bearings are mitigated because of the rough adjustment of the balance rings. The range over which the forward thrust of the impeller can be effectively balanced is broadened considerably over the possible range with balance rings alone. Substantially zero net thrust can be obtained over a wide range of pump operating conditions. This wider range, combined with the fact that precise calibration is no longer as important, avoids most of the problems discussed above for conventional balance rings.

The slide valve is actuated in the same manner as in the open motor compartment pump. The shaft is reciprocated axially thereby varying the opening of the slide valve. This varies the net thrust against the rotor. The only significant difference is that the pressure is supplied by the auxiliary impeller rather than the pump impeller. The flow in the motor compartment is from the auxiliary impeller in the front section, across the gap between rotor and stator to the rear section, through the slide valve into the shaft channel and along the channel back to the inlet to the auxiliary impeller, from which it is again passed out into the front section. The pressure in the front section is accordingly higher than in the rear section and a rearward thrust is obtained in the same manner as in the previously described embodiment.

The improved features of this invention will be readily apparent from the detailed description of a canned pump including this invention given below taken in conjunction with the drawings.

FIGURE 1 is a partial longitudinal section of a canned centrifugal pump including the thrust balancing features of this invention;

FIGURE 2 is a partial longitudinal sectional view of a portion of the canned pump of FIGURE 1, utilizing an external slide valve member; and FIGURE 3 is a partial longitudinal section of a canned centrifugal pump including the thrust balancing features of this invention and having a sealed motor section not in fluid flow connection with the pump section.

The pump of FIGURE 1 comprises a housing generally indicated by 11, which is formed of the motor section 14, and the pump section 15, held together by bolts 17. The motor section is closed off by annular end plate 19, also held by bolts 17, and by inner circular end plate 18. Leakage through the joint between the sections of the pump housing is prevented by gaskets 40 and 49.

The pump section 15 includes a pump chamber 22 having an outlet 23, an inlet 20 and an impeller 21 located in the chamber 22 in fluid-intercepting relationship between the inlet 20 and outlet 23.

The impeller 21 is fitted onto an impeller shaft 24 and locked thereto by bolts 25, which are threaded into the impeller 21 and the shaft 24. A necked-down portion of the shaft 24 extends through an opening 30 at the back end of the impeller 21. The shaft 24 has a central axial channel 33 passing along its full length and opening into the back of the impeller. Three rear lateral passages 36 extend from the axial channel 33 through the lateral wall of the shaft 24. The three passages 36 are provided at 120° intervals around the circumference of shaft 24. Radial passages 27 extend through the wall of shaft 24 at its forward end. When the impeller 21 rotates, fluid at the center of the impeller is at the inlet pressure and fluid at the outer circumference of the impeller is at the higher outlet pressure.

The rear of the pump chamber 22 is separated from the motor section by annular plate 37, having orifices 54 spaced around its outer periphery. The motor section contains a stator cup shell 38 separating it into a stator chamber 42 and a rotor chamber 44. The shell has a front flange 41, held in place between the pump section housing 15 and the motor section housing 14.

Stator chamber 42 is an annular chamber formed between the inner surface of the motor housing 14 and the stator cup shell 38. The stator 102 is held therein and is connected to a power source, not shown.

Bearing holder 46 is within the rotor chamber 44, and has a circular flange 48 projecting forwardly through the central hole in the annular plate 37, so that it is held thereby. The outer rim of annular plate 37 is held between ledge 50 in the pump section housing 15 and the front flange 41 of the stator cup shell 38. The raised portion 52 on the outer rim of annular plate 37 serves to space the plate 37 away from the flange 48 and defines a passage for fluid flow from orifices 54 into space 56 between bearing holder 46 and plate 37. The bearing holder 46 has passages 58 formed in the outer periphery thereof for fluid flow from space 56 into the rotor chamber 44.

Rotor assembly 60 is rigidly attached to the shaft 24 and comprises a can 62 having a front inset cover 64 and a rear inset cover 65 and enclosing the rotor coils 66. The front and rear covers are shown as being of equal size. A front bearing 68 is press-fitted into and positioned within a socket in bearing holder 46 by pins 70. The front bearing 68 has radial and axial channels 73 formed in its surface connecting with the radial channels 27 in the shaft 24. Fluid from the rotor chamber flows through these channels to lubricate the bearing.

The rotor assembly 60 divides the rotor chamber into a front section and a rear section. The restricted passage between the rotor and stator shell allows fluid to pass from the front to the rear portion. The area for flow through the gap between the rotor 66 and cup shell 38 is smaller than the total flow area through passages 36 so that the pressure drop through the passages 36 is substantially smaller than that across the gap between the rotor and stator shell. The rear portion of the rotor chamber is closed off by inner circular end plate 18 which is held against lip 80 of the back plate 19 and the inner lateral surface of stator cup shell 38. The plate 18 has a circular flange 82 extending forwardly into the rotor chamber 44 and defining a bearing socket 84 in which is press-fitted a rear support bearing 86. The bearing 86 is positioned by pins 88 and has axial and radial channels 87 for passage of fluid therethrough for lubricating and cooling the bearing. An inner plate 90 having an internally threaded central hole is firmly held in the socket 84 in a press-fit between the bearing 86 and the inner-face of the end plate 18. An externally threaded slide valve support 92 is threaded into the inner plate 90 and the plate is positioned axially in the socket by the support. The support 92 extends forwardly into the axial channel 33. A slide valve 94 is held on the end of the valve support 92 by a pin 98 which passes through matching holes in the valve 94 and in the valve support 92. As shown, the internal diameter of the valve 94 is somewhat greater than the external diameter of the valve support 92 so that it forms a loose fit. The pin is loosely fitted so that the valve 94 can move radially and position itself with respect to the shaft channel 33. Thus, even when the bearings wear, the valve remains concentric to the shaft: as the shaft moves radially, the valve body can move radially also. The length of the support 92 is such as to place the valve 94 adjacent the rear lateral passage 36.

Radial and axial passages 99 are provided along the internal perimeter of the valve 94 for the passage of fluid to the channel 33 from the bearing 86. These passages permit the bearings to be lubricated even when the passage 36 is closed by valve 94. The passages 99 have a smaller total cross-sectional area than passages 87 in the bearing. This increases the pressure in the bearing which is desirable to prevent flashing when fluids are being pumped at or near their vapor pressure.

Stop rings 74 are rigidly attached to the shaft and are spaced to allow a sufficient axial play for the shaft 24, to permit opening and closing of the rear passage 36 by the slide valve 94. As shown, the slide valve 94 is somewhat longer than the passage 36 such that the passage 36 can be completely closed off without the stop ring 74 coming into contact with the bearings 68 and 86.

With the shaft in its rearmost position, such that the stop ring 74 is in contact with the transverse face of the rear bearing 86, the valve 94 is opposite, and closes off, the passage 36, as shown, thereby substantially shutting off fluid flow between the rear section of the rotor chamber 44 and the axial channel 33. A smaller proportion of fluid continuously flows through the channels 87 in the rear bearing and through channels 99 into the channel 33 for cooling and lubricating the bearings.

In the embodiment shown in FIGURE 1, the rear end of the channel 33 in the shaft opens into space 100, formed between the rear of the shaft 24 and the front face of the plate 90, which allows fluid to circulate through the channels 87.

This type of canned pump operates with the rotor compartment 44 filled with the pumped fluid. The bearings 68 and 86 are thus lubricated and cooled by the pumped fluid, and the rotor assembly 60 and shaft 24 are also cooled by the same fluid. Similarly, the stator compartment 42 is cooled by fluid flowing through the rotor compartment. The pumped fluid enters the rotor chamber 44 through channels 54 and 58, and fills the axial shaft channel 33 through channel 36 and the front opening in the shaft 24.

In operation, before the pump is turned on, it is filled with the pumped fluid: the rotor chamber 44, the axial channel 33 and the impeller chamber 22 are filled. The pump is then turned on. The pumped fluid enters the pump chamber 22 through inlet 20, passes into the rotating impeller 21 and out of the chamber 22, where a major portion passes out of the outlet 19, and a minor portion, due to the higher pressure at the outlet, passes into the front portion of the rotor chamber 44 through passages 54, 56 and 58. As the impeller 21 rotates, its forward thrust pulls the shaft 24 forward. This forward movement of the shaft opens the passage 36, so that fluid is circulated from the rotor compartment 44 through the axial channel 33 and into the impeller 21. The fluid flows through the rotor chamber 44 via the gap between the rotor can 62 and the stator cup 38, from the front portion to the rear portion of the rotor chamber, whence it can enter the passage 36.

Fluid from the front rotor chamber 44 enters radial passage 73, passes along the full length of the bearing, and through passage 27 to the axial channel 33. The flow through the rear bearing enters radial passage 87, passes to the chamber 100 and into the rear of channel 33. The fluid passes through passages 99 in the valve 94 and then up along channel 33.

Due to the connection between the pump chamber 22 and the forward portion of the rotor chamber 44 at the outer radius of the pump chamber 22, the fluid pressure in that front portion is substantially at the pump exhaust pressure. As the orifices and connecting passages are relatively large for the amount of flow passing between the pump chamber and the rotor chamber, the pressure drop between the pump outlet 23 and the front portion of the rotor chamber 44 is small Accordingly, the front cover 64 of the rotor can 64 is exposed to a pressure very nearly equal to the exhaust pressure.

The pressure against the rear cover 65 of the rotor can is appreciably less than that against the forward and when the passage 36 is open, but still greater than the inlet pressure. This is possible because the pressure drop across the gap between the rotor and stator is large and because of the pressure drop required through the channels 87 and 99 through the rear bearing and through the valve 94. Accordingly, when the outlet pressure is greater than the inlet pressure, and the surface areas of covers 64 and 65 are equal, the net thrust against the rotor will be in a rearward direction, and will act against the shaft in that manner.

The passage 36, the gap between the rotor and stator, the shaft end-play and the areas of the can covers 64 and 65 are so dimensioned that when the passage 36 is fully open, the rearward thrust caused by the pressure drop across the gap is greater than the forward thrust of the impeller.

Accordingly, when the pump is turned on, if the shaft is in the position such that the passage 36 is completely opened, the net thrust against the shaft, taking into account the pressure drop across the can and the pressure drop across the impeller, will be in a rearward direction, forcing the shaft backwards so as to close the passage 36 by covering it with the valve 94. At a certain point, when the flow through the passage 36 and thereby the flow across the gap is sufficiently restricted, the pressure drop across the gap will be reduced to a point where the net rearward thrust exerted on the shaft by the can is equal to the net forward thrust exerted by the impeller, and the axial thrust exerted on the shaft will then be balanced, and equal to zero. In this balanced position, neither of the stop rings 74 will be pressed against the end forces of bearings 68 or 86, respectively. It should be pointed out, however, that whenever the load on the pump changes, the shaft movement will restart until a new balancing position is found.

The axial movement of the shaft required to balance the thrust under varying pump loads is very small and is normally well within the normal end play between thrust bearings. For example, in a particular 20 H.P. 3 x 2½, pump, having an effective front and rear rotor surface area of 17.65 sq. in. each, the total axial movement of the shaft to balance the forward thrust of the impeller as the pump flow rate is varied from shut-off to 325 gallons per minute is 0.080 inch. This is less than the end play of the bearings; therefore, the bearings are not subjected to thrust load at any time. As the pump conditions were varied, the shaft would move until it found the position at which the thrust was balanced for each condition.

The embodiment of FIGURE 2 (which shows only the rear portion of the rotor chamber 44), is of a second embodiment of a slide valve. The rest of the pump construction is the same as in FIGURE 1.

A spider frame member 110 is clamped to the flange 82 of the plate 18 by clamp 11. Annular frame 113 is rigidly attached to spider member 110. Annular valve 114 is loosely held by the annular frame 113, and encircles the shaft 24 at a position adjacent to the passage 36. The valve is held so as to be self-centering with respect to the shaft as is valve 94. The spider frame 110, the clamp 112 and the frame 113 and valve 114 can be formed in sections and clamped or otherwise joined together when they have been placed around the flange 82 and the shaft 24.

The embodiment of FIGURE 2 operates in the same manner as the embodiment of FIGURE 1, in that the valve 114 serves to open or close the passage 36 to fluid flow as the shaft 24 reciprocates axially, as explained above. The construction of the valve of FIGURE 1 is simpler than the valve of FIGURE 2, and is preferred.

The passages 56 and 58 connecting the front section of the rotor chamber 44 to the impeller chamber 22 and the outlet from the axial channel 33 to the impeller inlet 20 need not be as shown. It is only necessary that the connection to the axial channel 33 be to the interior portion of the impeller, preferably as close to the center as possible. The connection between the forward section of the rotor chamber 44 and the impeller chamber, on the other hand, is preferably as far from the center of the impeller as is practicable. In this way, the greatest possible pressure difference is obtained across the rotor can 62 when the passage 36 is fully opened.

The pump of FIGURE 3 is of the sealed motor type, where the motor compartment is separated from the pumped fluid. The pump is very similar to that of FIGURE 1, and where the parts are the same, the same number is used as in FIGURE 1. The pump comprises a housing generally indicated by 11, which is formed of the motor section 14, and the pump section 15, held together by bolts 17. The motor section is closed off by annular end plate 19, also held by bolts 17, and by inner circular end plate 18.

The pump section 15 includes a pump chamber 22 having an outlet 23, an inlet 20 and an impeller 221 located in the chamber 22 in fluid-intercepting relationship between the inlet and outlet.

The impeller 221 is attached to impeller shaft 224, as described for FIGURE 1. Shaft 224 has a central axial channel 233 extending from the rear of the shaft to a position near the front end of the shaft. Three rear lateral passages 36 extend from the axial channel 233 through the lateral wall of the shaft 224. The three passages 36 are provided at 120° intervals around the circumference of shaft 224.

Radial passages 27 extend from the front end of the channel 233 through the wall of the shaft 224. Radial passages 254 pass through the wall of the shaft 224 and connect with radial arms 253 of an auxiliary impeller.

The rear of the pump chamber 22 is separated from the motor section by annular plate 237 and bearing holder 246 substantially sealing the pump chamber 22 from the rotor section 44.

The motor section contains a stator cup shell 38 separating it into a stator chamber 42 and a rotor chamber 44. The shell has a front flange 41, held in place between the pump section housing 15 and the motor section housing 14. The stator chamber and stator are as described for FIGURE 1.

Bearing holder 246 is within the rotor chamber 44, and has a circular flange 248 projecting forwardly through the central hole in annular plate 237 so that it is held thereby. The flange 248 defines a socket for the impeller 221 within which it can rotate as well as reciprocate axially with the shaft. The cylindrical portion 252 of the impeller is concentric to and forms a close fit with flange 248 to define the balance rings for the pump. These balancing rings need only be roughly adjusted to counteract the thrust of the impeller 221.

The outer rim of annular plate 237 is held between ledge 50 in the pump section housing 15 and the front flange 41 of stator cup shell 38. The passage 234 through the rear wall of the impeller connects the central portion, or inlet portion, of the impeller with the space behind the impeller 221 defined by the flange 248 and rear wall of the impeller. The pressure in this space is some value between the inlet and outlet pressures of the impeller 221, depending upon the degree of seal provided between flange 248 and the rear portion 252 of the impeller.

Rotor assembly 60 is rigidly attached to the shaft 224 to the rear of the auxiliary impeller 253 and comprises a can 62 having a front inset cover 64 and a rear inset cover 65 and enclosing the rotor coils 66. The front and read covers are shown as being of equal size. A front bearing 68 is provided as defined above for FIGURE 1.

The rotor assembly 60 divides the rotor chamber into a front section and rear section, with the auxiliary impeller in the front section. The rear section of the rotor chamber is closed off as defined above for FIGURE 1 by inner circular end plate 18. The plate 18 has a circular flange 82 extending forwardly into the rotor chamber 44 and defining a bearing socket 84 in which is press-fitted a rear support bearing 86, as defined above for FIGURE 1. The slide valve support 92 and the slide valve 94 are provided and attached as described above for FIGURE 1.

Stop rings 74 are rigidly attached to the shaft and are spaced to allow a sufficient axial play for the shift 224, to permit opening and closing of the rear passage 36 by the slide valve 94. As shown, the slide valve 94 is somewhat longer than the rear passage 36 such that the passage can be completely closed off without the stop ring coming into contact with the bearing.

With the shaft in its rearmost position, such that the stop rings 74 are in contact with the transverse face of the rear bearing 86, the valve 94 is opposite, and closes off, the passage 36, as shown, thereby shutting off fluid flow between the rear portion of the rotor chamber 44 and the axial channel 33.

In operation, before the pump is turned on the pump chamber 22 is filled with fluid. The rotor chamber 44, including the axial channel 233, is already filled. When these spaces are filled, the pump is turned on. The pumped fluid enters the pump chamber 22 through inlet 20, where it passes out of the outlet 19. As the impeller 221 rotates, its forward thrust pulls the shaft 224 forward. This forward movement of the shaft opens the passage 36 so that fluid is circulated from the rotor compartment 44, through the axial channel 233, through the passage 254 into the auxiliary impeller 253, and out into the front portion of the rotor chamber 44. The fluid flows through the gap between the rotor can 62 and the stator cup 38 from the front to the rear of the rotor chamber where it again can enter the passage 36.

The pressure in the front section of the rotor chamber 44 acting against the front face 64 of the rotor can will be the exhaust pressure from auxiliary impeller 253. The pressure in the rear portion of the rotor chamber 44 and therefore against the rear face 48 of the rotor can will be substantially less than that from the front portion well be substantially less than that from the front portion and the difference will equal the pressure drop across the gap between the rotor and the stator. This is substantially the same principle as in the pump of FIGURE 1, with the exception that the pressure in the front portion of the rotor chamber 44 is set by the exhaust pressure of the auxiliary impeller 253 instead of by the exhaust pressure of the main impeller 221. The net rearward thrust against the rotor and accordingly aganist the shaft is still the difference between the force against the front face 64 of the rotor and the thrust against the rear face 65 of the rotor. The movement of the shaft and the consequential opening and closing of passage 36 by the valve body 94 varies the pressure difference between the front and rear portions of the rotor chamber by varying the amount of flow passing therebetween, also as in the pump of FIGURE 1.

The primary difference between the pump of FIGURE 1 and the pump of FIGURE 3 is that the auxiliary impeller and thrust control valve will usually be unable to provide sufficient rearward thrust to balance the forward thrust of the impeller 221. When it is desired to obtain a zero net thrust, or an almost perfect balance of the shaft, an additional balancing method usually must be used. In the pump of FIGURE 3, balance rings are provided, defined by flange 248 and the rear portion 252 of the impeller 221. These balance rings need be only roughly calibrated to balance the thrust of the impeller, as the fine balancing is provided by the auxiliary impeller and thrust control valve arrangement described above.

The balance rings operate by setting the pressure over a portion of the rear surface of the impeller approximately equal to that of the inlet pressure to the impeller, thereby decreasing the total forward force exerted against the impeller, i.e. looking at FIGURE 3, the total force in a forward direction against the impeller is the sum of the force exerted against the portion of the impeller telescoped within flange 248, which is under a pressure approximately equal to that of the inlet pressure, and the pressure against the portion of the impeller outside of flange 248 which is under the pressure at the impeller exhaust. Accordingly, by varying the diameter of the flange 248 and the portion 252 of the impeller, the total forward thrust against the impeller can be varied. Similarly, by varying the clearance between the flange 248 and the member 252, the pressure within the portion defined by flange 248 can also be varied. With the balance rings provided the major portion of the thrust balancing, the auxiliary impeller and slide valve will provide the necessary additional thrust depending upon the particular conditions under which the pump is operated.

Accordingly, when the pump is turned on, if the shaft is in the position such that the passage 36 is completely opened, the net thrust against the shaft, taking into account the pressure drop across the can and the pressure drop across the impeller, including the effect of the balance rings, will be in a rearward direction, forcing the shaft backwards so as to close the passage 36 by covering it with the valve 94. At a certain point, when the flow through the passage 36 and thereby the flow across the gap is sufficiently restricted, the pressure drop across the gap will be reduced to a point where the net rearward thrust exerted on the shaft by the can is less than the net forward thrust exerted by the impeller, and the shaft will then be moved forward, opening the passage 36. The shaft will be reciprocated in this manner until it is so positioned that the flow through passage 36 is just sufficient to maintain a rearward net thrust by the rotor equal to the forward net thrust produced by the impeller. At this point, the net thrust on the shaft will be zero and the shaft will be in a balanced position at a point between the extremes of its axial play.

Alternatively, the balance rings can be eliminated and the net thrust of the impeller partially or wholly balanced by the secondary impeller. The slide valve of FIGURE 2 can be substituted into this embodiment also.

As described above, a pump is provided wherein the frictional wear between the bearings is minimized by overcoming the forward thrust exerted on the shaft by the impeller with a net rearward thrust exerted on the shaft by a pair of pressure surfaces. With the pump of this invention, there is no danger that there will be any bearing lubrication starvation due to the movement of the shaft and the necessity to change the amount of internal fluid circulation through the impeller shaft. At the same time it is now possible to provide balancing over a far wider range of operating conditions and for a wider range of pump sizes.

The arrangements described above are especially valuable when operating a canned pump under extreme conditions, where maximum cooling of the motor is required. In the above devices, substantially all of the fluid passing through the motor compartment for thrust balancing flows between the rotor and stator. This provides the maximum amount of cooling possible with the fluid passed rearwardly to balance thrust. This further improves efficiency by rendering it unnecessary to pass any additional fluid for cooling, or alternatively to pass only a minimum amount of extra fluid when especially severe conditions warrant it.

When pumping a volatile fluid at or near its vapor pressure, it is desirable that the pressure in the rear of the rotor chamber and at the bearings be greater than the inlet pressure of the pump, to prevent flashing of the fluid after it is heated by the motor. The front bearing is kept substantially at impeller outlet pressure while the rear bearing is under a pressure greater than the pump inlet pressure because of the pressure drop across the channels 99 in the valve 94. The liquid flowing through the rear bearing must always pass through the channel in the valve to reach the forward portion of the shaft channel and the inlet to the impeller. The throttling effect of channel 99 keeps the pressure of the fluid at the pressure above that of the pump inlet.

Similarily, very simple but efficient valve means are provided for varying the pressures which result in the rearward thrust opposing the forward thrust of the impeller. This is done without interfering with the flow of lubricating fluid to the bearings and without any need for changing the configuration of the impeller. There are in fact no attachments to the shaft or the impeller which could affect their regular operation.

The various parts of the pump housing 11 are shown as being bolted together for ease of maintenance and breaking down the entire unit. However, it is also possible to weld, braze or solder the sections together or press-fit them with an adhesive or to cast the housing into two axially split halves and then connect them as described.

The above-described embodiments are merely exemplary of this invention, the scope of which is defined by the following claims.

Having regard to the foregoing disclosure, the following is claimed as the inventive and patentable embodiments thereof:

1. A motor pump comprising, in combination, a housing, an impeller shaft chamber and a pump chamber having a fluid inlet and outlet therein, an impeller rotatably disposed across the line of fluid flow therebetween, an impeller shaft in the impeller shaft chamber extending into the pump chamber and supporting the impeller, bearing means in the housing rotatably supporting the shaft and allowing axial movement of the shaft, a divider attached to the shaft, having a front pressure surface and a rear pressure surface and dividing the impeller shaft chamber into a rear fluid section and front fluid section, the rear pressure surface under fluid pressure in the rear fluid section tending to urge the shaft forwardly, and the front pressure surface under fluid pressure on the outlet side of the impeller tending to urge the shaft rearwardly, a restricted fluid passage connecting the front and rear fluid sections, an axial passage in the shaft having a front opening connecting the axial passage to the inlet side of the impeller and a lateral rear opening connecting the axial passage to the rear fluid section, a slide valve in telescoping sliding fit relationship to the shaft in close proximity to the lateral rear opening, and in one position of the shaft substantially closing off the lateral rear opening to fluid, and in a second position of the shaft permitting fluid flow via the lateral rear opening between the rear fluid section and the axial passage, and means defining a fluid flow passage for passing a lubricating flow of fluid through said bearing means at all positions of said slide valve means; the pressure surfaces being dimensioned to produce a net rearward thrust against the shaft when there is flow through the lateral rear opening, to overcome forward thrust produced by the impeller.

2. The pump of claim 1 wherein the slide valve is supported within the axial passage and wherein the passage is through the slide valve and is open at all positions thereof.

3. The pump of claim 1 wherein the impeller shaft chamber is a motor chamber including a rotor chamber and a stator chamber and comprising a rotor attached to the impeller shaft in the rotor chamber and a stator in the stator chamber, separated by a narrow gap from the stator.

4. The pump of claim 3 wherein the divider comprises a can enclosing the rotor, the ends thereof forming the front and rear pressure surfaces.

5. The pump of claim 4 wherein the area of the front and the rear pressure surfaces are equal.

6. The pump of claim 4 wherein the restricted fluid passage is provided by the gap between the rotor and the stator.

7. The pump of claim 6 comprising in addition an inner shell within the housing separating the rotor chamber from the stator chamber, the gap being formed between the rotor and the shell.

8. The pump of claim 3 wherein the impeller is a centrifugal impeller having an axial opening for entry of fluid, and a circumferential opening for delivery of pumped fluid under centrifugal pressure therefrom.

9. A motor pump comprising, in combination, a housing, an impeller shaft chamber and a pump chamber having fluid inlet and outlet passages therein, means for preventing the flow of fluid between the shaft chamber and the pump chamber and an impeller rotatably disposed across the line of fluid flow therebetween, an impeller shaft in the impeller shaft chamber extending into the pump chamber and supporting the impeller, bearing means in the housing rotatably supporting the shaft and allowing axial movement of the shaft, a divider attached to the shaft, having a front pressure surface and a rear pressure surface and dividing the impeller shaft chamber into a rear fluid section and a front fluid section, an auxiliary impeller attached to the shaft in the front fluid section, the rear pressure surface under fluid pressure in the rear fluid section tending to urge the shaft forwardly, and the front pressure surface under fluid pressure on the outlet side of the impeller tending to urge the shaft rearwardly a restricted fluid passage connecting the front and rear fluid sections, an axial passage in the shaft having a front opening connecting the axial passage to the inlet side of the auxiliary impeller and a rear opening connecting the axial passage to the rear fluid section, a slide valve in telescoping sliding fit relationship to the shaft in close proximity to the rear opening, and in one position of the shaft substantially closing off the rear opening to fluid flow, and in a second position of the shaft permitting fluid flow via the rear opening between the rear fluid section and the axial passage while permitting fluid flow to the bearing means at all positions of the slide valve; the pressure surfaces being dimensioned to produce a net rearward thrust against the shaft when there is flow through the rear opening.

10. A motor pump comprising, in combination, a housing; an impeller rotatably disposed within the housing; an impeller shaft within the housing supporting the impeller and capable of axial as well as rotary movement; a pressure divider attached to the shaft having a front pressure surface and a rear pressure surface and dividing the housing into a rear fluid section and a front fluid section, the rear pressure surface under fluid pressure in the rear fluid section tending to urge the shaft forwardly, and the front pressure surface under fluid pressure on the outlet side of the impeller tending to urge the shaft rearwardly; a restricted fluid passage connecting the front and rear fluid sections, an axial passage in the shaft having a front opening connecting the axial passage to the inlet side of the impeller, and having a rear lateral opening in said shaft connecting the axial passage to the rear fluid section; and a slide valve in telescoping sliding fit relationship to the shaft in close proximity to and slidably opening and closing off the rear opening, the valve in one position of the shaft substantially closing off the rear opening to fluid flow, and in a second position of the shaft permitting fluid flow via the rear opening between the rear fluid section and the axial passage; the pressure surfaces being dimensioned to produce a net rearward thrust against the shaft when there is a flow through the rear opening, the front fluid section, the rear fluid section, restricted fluid passage, axial passage and front and rear openings thereof constituting a thrust balancing fluid flow circuit via the slide valve, the components of which are dimensioned to pass a thrust balancing fluid flow there-through at any open position of the slide valve.

11. A motor pump comprising, in combination, a housing; an impeller shaft chamber and a pump chamber having a fluid inlet and outlet therein, an impeller rotatably disposed across the line of fluid flow therebetween, an impeller shaft in the impeller shaft chamber extending into the pump chamber and supporting the impeller, bearing means in the housing rotatably supporting the shaft and allowing axial movement of the shaft, a divider attached to the shaft, having a front pressure surface and a rear pressure surface and dividing the impeller shaft chamber into a rear fluid section and front fluid section, the rear pressure surface under fluid pressure in the rear fluid section tending to urge the shaft forwardly, and the front pressure surface under fluid pressure on the outlet side of the impeller tending to urge the shaft rearwardly, a restricted fluid passage connecting the front and rear fluid sections, an axial passage in the shaft having a front opening connecting the axial passage to the inlet side of the impeller and a rear opening extending through a lateral wall of the shaft, connecting the axial passage to the rear fluid section, a slide valve in telescoping sliding fit relationship to the shaft in close proximity to the rear lateral opening, and in one position of the shaft substantially closing off the rear opening to fluid flow, and in a second position of the shaft permitting fluid flow via the rear opening between the rear fluid section and the axial passage; the pressure surfaces being dimensioned to produce a net rearward thrust against the shaft when there is flow through the rear lateral opening, to overcome forward thrust produced by the impeller.

12. The pump of claim 11 wherein the slide valve is disposed in telescoping relationship within the axial passage in the shaft.

13. The pump of claim 11 comprising a slide valve support firmly attached to the housing and supporting the slide valve within the axial passage.

14. The pump of claim 10 wherein the slide valve is rotatably supported on the support.

15. The pump of claim 13 wherein the slide valve is loosely supported by the support so as to have radial free play.

16. The pump of claim 11 wherein the slide valve encircles the shaft in telescoping relationship.

References Cited

UNITED STATES PATENTS

| | | | |
|---|---|---|---|
| 3,138,105 | 6/1964 | White | 103—87 |
| 3,220,350 | 11/1965 | White | 103—87 |
| 3,280,750 | 10/1966 | White | 103—112 |
| 3,261,295 | 7/1966 | White | 103—87 |
| 3,288,073 | 11/1966 | Pezzillo | 103—112 |

HENRY F. RADUAZO, *Primary Examiner.*

PO-1050
(5/69)

UNITED STATES PATENT OFFICE
CERTIFICATE OF CORRECTION

Patent No. 3,413,925      Dated December 3, 1968

Inventor(s) Joseph F. Campolong

It is certified that error appears in the above-identified patent and that said Letters Patent are hereby corrected as shown below:

Column 8, line 68, "clamp 11" should be --clamp 112--. Column 10, line 4, "read" should be --rear--; line 50, delete "well be substantially less than that from the front portion"; line 58, "aganist" should be --against--. Column 11, line 17, between "and" and "the" insert --of--; line 22, "provided" should be --providing--. Column 14, line 7, between "is" and "flow" delete "a"; line 12, delete the hyphen (-) in "there-through" line 50, "claim 10" should be --claim 13--.

SIGNED AND
SEALED
MAR 10 1970

(SEAL)
Attest:

Edward M. Fletcher, Jr.
Attesting Officer

WILLIAM E. SCHUYLER, JR.
Commissioner of Patents